US009734425B2

United States Patent
Zhong et al.

(10) Patent No.: US 9,734,425 B2
(45) Date of Patent: Aug. 15, 2017

(54) ENVIRONMENTAL SCENE CONDITION DETECTION

(71) Applicant: QUALCOMM Incorporated, San Diego, CA (US)

(72) Inventors: Xin Zhong, San Diego, CA (US); Feng Guo, San Diego, CA (US); Shili Xu, San Diego, CA (US); Jianfeng Ren, San Diego, CA (US); Yang Yang, Irvine, CA (US); Dashan Gao, San Diego, CA (US); Ruiduo Yang, San Diego, CA (US); Mainak Biswas, La Mesa, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 14/619,354

(22) Filed: Feb. 11, 2015

(65) Prior Publication Data

US 2016/0232423 A1 Aug. 11, 2016

(51) Int. Cl.

| G06K 9/00 | (2006.01) |
|---|---|
| G06K 9/52 | (2006.01) |
| G06K 9/46 | (2006.01) |
| B60H 1/00 | (2006.01) |
| B60S 1/08 | (2006.01) |
| B60Q 1/20 | (2006.01) |

(52) U.S. Cl.
CPC ........... *G06K 9/52* (2013.01); *B60H 1/00735* (2013.01); *B60Q 1/20* (2013.01); *B60S 1/0844* (2013.01); *G06K 9/00791* (2013.01); *G06K 9/4652* (2013.01); *G06K 9/4661* (2013.01); *G06K 9/00805* (2013.01)

(58) Field of Classification Search
CPC ..... B60H 1/00735; B60Q 1/20; B60S 1/0844; G06K 9/00791; G06K 9/00805; G06K 9/4652; G06K 9/4661; G06K 9/52; G06K 9/00624; G06K 9/00825
See application file for complete search history.

(56) References Cited

U.S. PATENT DOCUMENTS

| 6,434,254 B1 | 8/2002 | Wixson |
| 6,724,917 B1 | 4/2004 | Ohashi et al. |
| 7,602,942 B2 | 10/2009 | Bazakos et al. |
| 8,786,697 B2 | 7/2014 | Kawasaki |

(Continued)

FOREIGN PATENT DOCUMENTS

| DE | 102007023037 A1 | 11/2007 |
| WO | 2013173911 A1 | 11/2013 |

OTHER PUBLICATIONS

International Search Report and Written Opinion for International Application No. PCT/US2016/014144, ISA/EPO, Date of Mailing Apr. 13, 2016, 13 pages.

(Continued)

*Primary Examiner* — Siamak Harandi

(57) ABSTRACT

A method of processing data includes receiving, at a computing device, data representative of an image captured by an image sensor. The method also includes determining a first scene clarity score. The method further includes determining whether the first scene clarity score satisfies a threshold, and if the first scene clarity score satisfies the threshold, determining a second scene clarity score based on second data extracted from the data.

38 Claims, 6 Drawing Sheets

(56) References Cited

U.S. PATENT DOCUMENTS

| | | | |
|---|---|---|---|
| 9,009,083 | B1 | 4/2015 | Shetty et al. |
| 9,514,373 | B2 | 12/2016 | Jeromin et al. |
| 2004/0204812 | A1 | 10/2004 | Tran |
| 2006/0177098 | A1* | 8/2006 | Stam .................... B60Q 1/085 382/104 |
| 2007/0195680 | A1 | 8/2007 | Brinson et al. |
| 2007/0244844 | A1 | 10/2007 | Brinson et al. |
| 2008/0044062 | A1 | 2/2008 | Stam et al. |
| 2008/0061950 | A1 | 3/2008 | Kawasaki |
| 2008/0273752 | A1 | 11/2008 | Zhu et al. |
| 2010/0250106 | A1 | 9/2010 | Bai et al. |
| 2010/0259651 | A1 | 10/2010 | Fattal |
| 2010/0322478 | A1 | 12/2010 | Nitanda |
| 2011/0188775 | A1 | 8/2011 | Sun et al. |
| 2013/0057687 | A1 | 3/2013 | Ehlgen et al. |
| 2014/0072216 | A1 | 3/2014 | Fang et al. |
| 2014/0117852 | A1 | 5/2014 | Zhai et al. |
| 2014/0233795 | A1 | 8/2014 | Omino |
| 2014/0247968 | A1 | 9/2014 | Pavlic |
| 2014/0333468 | A1 | 11/2014 | Zhu et al. |
| 2015/0178953 | A1 | 6/2015 | Gao et al. |
| 2015/0336547 | A1 | 11/2015 | Dagan |
| 2015/0339811 | A1 | 11/2015 | Zhong et al. |
| 2016/0140725 | A1 | 5/2016 | Bergner et al. |

OTHER PUBLICATIONS

Groszek, M. L., et al., "Haze Removal for Image Enhancement", Proceedings of SPIE & IS&T Electronic Imaging, 2005, vol. 5678, SPIE, Bellingham, WA, pp. 254-265.

Hautiere, N., et al., "Combination of Roadside and In-vehicle Sensors for Extensive Visibility Range Monitoring," International Conference on Advanced Video and Signal Based Surveillance, 2009 IEEE, Piscataway, NJ, pp. 388-393.

Hautiere, N., et al., "Detection of Visibility Conditions through Use of Onboard Cameras," IEEE Proceedings Intelligent Vehicles Symposium, Jun. 6-8, 2005, IEEE, Piscataway, NJ, pp. 193-198.

Narasimhan, S.G., "Models and Algorithms for Vision through the Atmosphere," Graduate School Thesis, 2003, Columbia University, New York, NY pp. 1-205.

Kopf, J., et al., "Deep Photo: Model-Based Photograph Enhancement and Viewing," ACM Transactions on Graphics—Proceedings of SIGGRAPH Asia 2008, vol. 27, Issue 5, Association for Computing Machinery, New York, NY, 10 pages.

Dong, N., et al., "Adaptive Object Detection and Visibility Improvement in Foggy Image," Journal of Multimedia, Feb. 2011, vol. 6, No. 1, Academy Publisher, Road Town, Tortola, British Virgin Islands, pp. 14-21.

Kponou, EA., et al., "A Comprehensive Study on Fast Image Dehazing Techniques," International Journal of Computer Science and Mobile Computing, Sep. 2013, vol. 2, No. 9, pp. 146-152.

Fattal R, "Single Image Dehazing," ACM Transactions on Graphics, XP055191725, Aug. 1, 2008 (Aug. 1, 2008), vol. 27, No. 3, p. 9, ISSN: 0730-0301, DOI: 10.1145/1360612.1360671.

Narasimhan S G, et al., "Contrast Restoration of Weather Degraded Images," IEEE Transactions on Pattern Analysis and Machine Intelligence, IEEE Computer Society, USA, XP001185045, Jun. 1, 2003 (Jun. 1, 2003), vol. 25, No. 6, pp. 713-724, ISSN: 0162-8828, DOI: 10.1109/TPAMI.2003.1201821.

* cited by examiner

ENVIRONMENTAL SCENE CONDITION DETECTION

I. FIELD

The present disclosure relates generally to scene detection. More specifically, aspects of this disclosure relate to the detection of environmental scene conditions.

II. DESCRIPTION OF RELATED ART

Various environmental conditions can impair the visibility of a scene. For example, fog, haze, rain, smog, snow, sleet, condensation, wintery mix, and/or other environmental conditions can make a scene less clear than if such conditions were absent from the scene. Additionally, environmental conditions may obscure other objects within a scene. Accordingly, environmental scene conditions may make driving a vehicle more difficult when present in a scene viewed by the driver. Further, some vehicles may be equipped with an advanced driver assistance system (ADAS). The ADAS may receive data from a camera that captures images of an area around a vehicle. In some implementations, the camera may be positioned inside the vehicle such that a clarity condition through the windshield may affect the clarity of a captured image. That is to say, the conditions of the environment within the vehicle and/or the environment outside of the vehicle may affect the clarity of the captured image. For example, temperature between the inside of a vehicle and the ambient environment may cause fog or condensate to form on the windshield, absent fog, rain, or haze, or other environmental conditions outside of the vehicle. The ADAS may perform various functions, based on the images, to assist in operation of the vehicle. However, if the captured images are unclear (e.g., due to environmental scene conditions), the ADAS may be unable to function properly and/or the driver may be less able to perform necessary operations.

III. SUMMARY

A system and a method for detecting environmental scene conditions, for example, haze, smog, and/or weather, and initiating actions based on the conditions are disclosed. The environmental scene condition may be detected based on an image being categorized as unclear. The actions may include using image processing to clarify the image, outputting a message, activating one or more systems of a device, or a combination thereof. The system and method may be implemented in electronic devices, automotive system consoles (e.g., ADAS), mobile devices, gaming consoles, wearable devices (e.g., personal mounted cameras), head mounted displays, etc. Additional examples include, but are not limited to, robots or robotic devices, unmanned aerial vehicles (UAVs), and drones.

For example, an environmental scene condition detection module may receive an input image representative of a scene viewed from a vehicle and may determine whether the input image includes one or more environmental scene conditions (e.g., due to rain, fog, a foggy windshield, smog, etc.). To determine whether the image includes one or more environmental scene conditions, the environmental scene condition detection module may extract first data (e.g., dark feature data) from data describing the input image and compare the first data to a first scene clarity model (e.g., a supervised machine learning model, such as a linear support vector model) to determine a first scene clarity score. The environmental scene condition detection module may compare the first scene clarity score to a first threshold, and when the first scene clarity score does not satisfy the first threshold, determine that the input image does not include one or more environmental scene conditions that might make the scene less clear. Thus, images of clear scenes may be identified based on dark features, without performing more complex gradient phase operations.

When the first scene clarity score satisfies the first threshold, the environmental scene condition detection module may determine a second scene clarity score by extracting second data (e.g., the dark feature data and gradient phase data) from the data describing the input image and comparing the second data to a second scene clarity model (e.g., a supervised machine learning model, such as a linear support vector model). The environmental scene condition detection module may determine that the input image is not clear when the second scene clarity score satisfies a second threshold. The environmental scene condition detection module may further initiate an action (e.g., enhancing the image to generate a clarified image, generating a warning, activating light systems onboard the vehicle, activating other vehicle systems, augmenting a display, sending a message to another device, etc.) when the image is not clear and/or when the image includes one or more environmental conditions indicative that the image might not be clear. The action may enable safer operation of the vehicle in unclear conditions.

In one aspect, a method of processing data includes receiving, at a computing device, data representative of an image captured by an image sensor. The method also includes determining a first scene clarity score of the image based on first data extracted from the data. The method further includes, determining whether the first scene clarity score satisfies a threshold, and if the first scene clarity score satisfies the threshold, determining a second scene clarity score based on second data extracted from the data.

In another aspect, an apparatus includes a computing device. The computing device is configured to receive data representative of an image captured by an image sensor. The computing device may be further configured to determine a first scene clarity score of the image based on first data extracted from the data. The computing device may be configured to determine whether the scene clarity score satisfies a threshold. If the first scene clarity score satisfies the threshold, the computing device may determine a second scene clarity score based on second data extracted from the data.

In another particular aspect, a computer-readable storage medium stores instructions that, when executed by a processor, cause the processor to perform operations. The operations include receiving data representative of an image captured by an image sensor. The operations also include determining a first scene clarity score of the image based on first data extracted from the data. The operations further include determining whether the first scene clarity score satisfies a threshold, and if the first scene clarity score satisfies the threshold, determining a second scene clarity score based on second data extracted from the data. The operations further include determining whether to automatically initiate an action based on the second scene clarity score.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
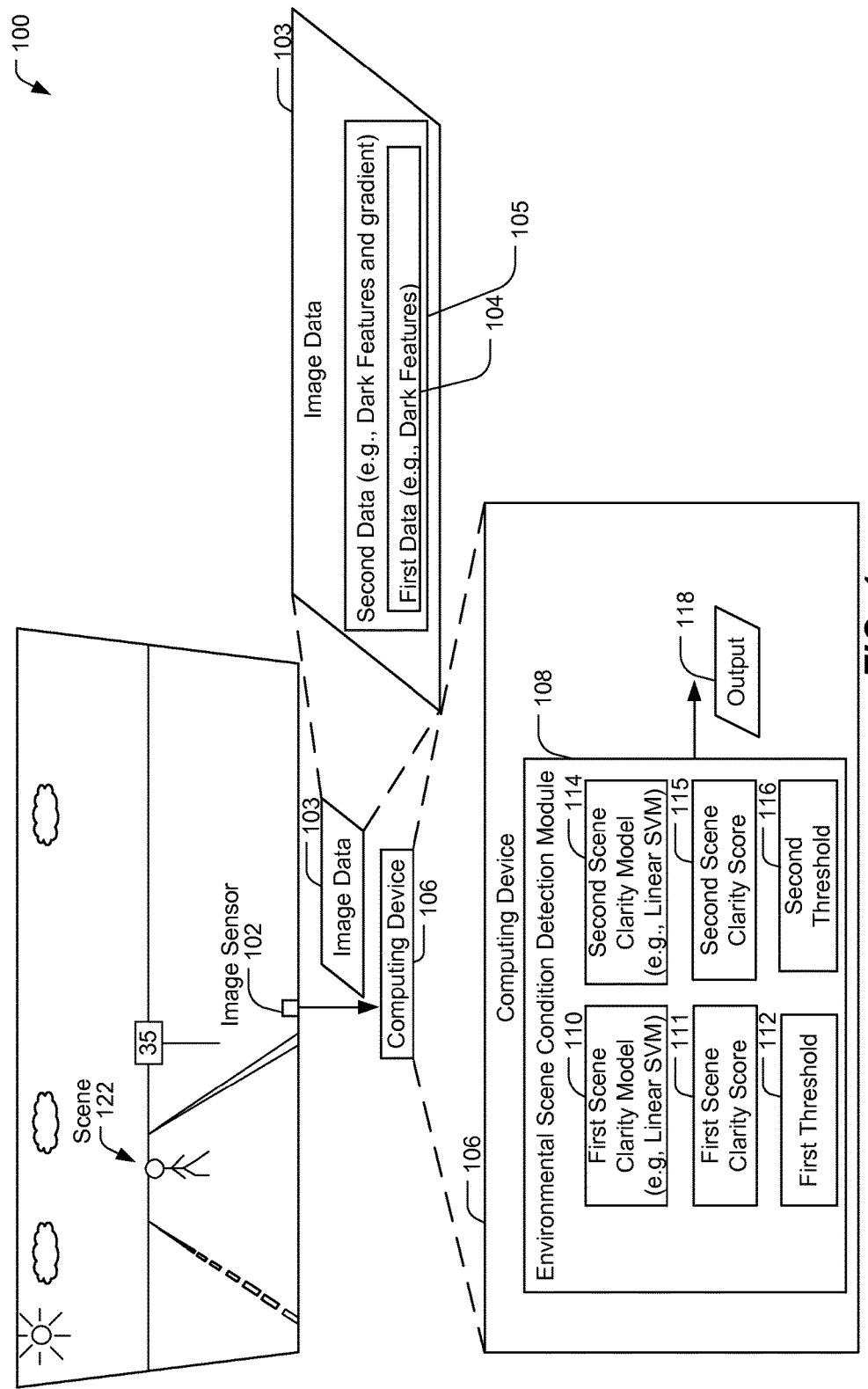
FIG. 1 is a block diagram of a particular illustrating a particular system for environmental scene condition detection.

Referring to FIG. 1, a block diagram illustrating a system 100 for detecting environmental scene conditions is shown. The system 100 includes an image sensor 102 (e.g., a camera). The image sensor 102 may be positioned to capture images of a scene 122. The scene 122 may be representative of a scene viewed from a vehicle, representative of a view of a human (e.g., the image sensor 122 may be included in data glasses or another head mounted camera), or representative of a scene surrounding a robot, such as an unmanned aerial vehicle. In a further example, the scene 122 may be captured by a mobile device, such as a mobile phone or tablet computer.

In examples in which the scene 122 is representative of a scene viewed from a vehicle, the images of the scene 122 captured by the image sensor 102 may be captured through a windshield (e.g., the image sensor 122 may be mounted in a rear view mirror assembly) or other window of the vehicle. In such instances, the image may include environmental conditions from within the vehicle and from outside of the vehicle. In other examples, the image sensor 102 may be outside of the vehicle. The image sensor 102 may be a digital camera capable of taking still images, videos, or both. In particular examples, the system 100 includes more than one image sensor. For example, the system 100 may include image sensors that correspond to a rear window, side windows, a windshield, or a combination thereof. In particular examples, the image sensor 102 is configured to capture thirty images per second.

The system 100 further includes a computing device 106. The image sensor 102 is in communication (e.g., via a wired or wireless connection) with the computing device 106. The computing device 106 and the image sensor 102 may be located in approximately the same location or in different locations. For example, both the computing device 106 and the image sensor 102 may be located onboard a vehicle. In another example, the computing device 106 may be located onboard a vehicle while the image sensor 102 is located outside of the vehicle. To illustrate, the image sensor 102 may be located in a different vehicle that is in communication with the vehicle including the computing device 106. In another illustrative example, the image sensor 102 may be located at a fixed site (e.g., a weather station) or at a mobile (e.g., a weather balloon) piece of infrastructure that is in communication with the vehicle including the computing device 106. Further, the image sensor 102 may be located onboard a vehicle while the computing device 106 is located offsite at a location (e.g., at a computing center) that is in communication with the vehicle. While the previous examples illustrate the relative locations of the image sensor 102 and the computing device 106 with respect to a vehicle, it should be noted that in some implementations, neither the image sensor 102 nor the computing device 106 is located in a vehicle. For example, one or both of the image sensor 102 and the computing device 106 may be located on a robot, a wearable computing device, a gaming system, or on a mobile device (e.g., a mobile phone or a tablet computer).

The computing device 106 may include an environmental scene condition detection module 108. The environmental scene condition detection module 108 and components of the environmental scene condition detection module 108 may correspond to hardware or software. For example, the environmental scene condition detection module 108 may correspond to software executed at a processor (e.g., a central processor unit, an image signal processor, or a combination thereof) of the computing device 106, hardware integrated in an image signal processor of the computing device 106, or a combination thereof.

Figure 2:
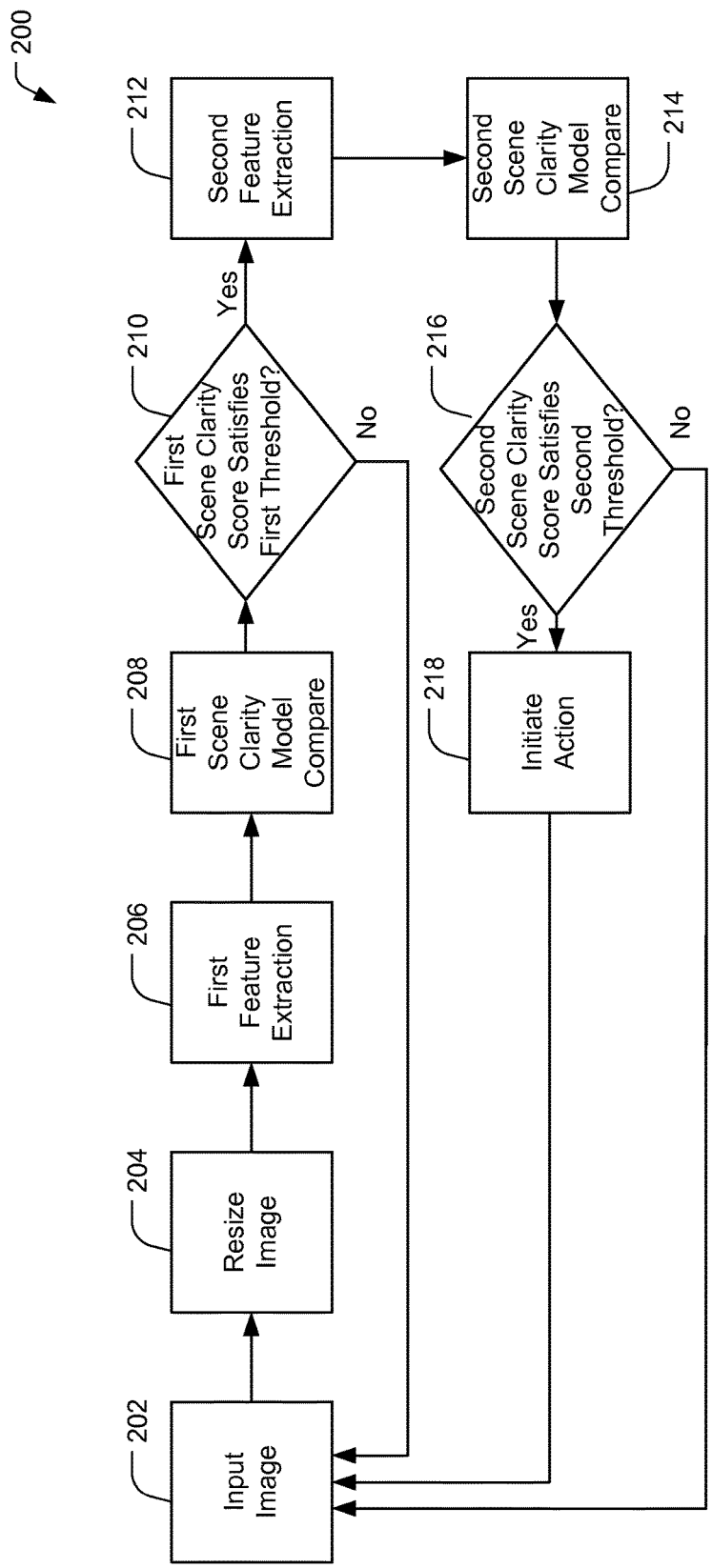
FIG. 2 is a flowchart illustrating a particular method of environmental scene condition detection.

Operation of the system 100 is described with reference to FIG. 2. FIG. 2 shows a flowchart illustrating a method 200. The method 200 may correspond to operation of a cascade classifier to detect unclear images. The method 200 includes receiving an input image, at block 202. For example, the environmental scene condition detection module 108 may receive image data 103 representing an image from the image sensor 102. The image may depict the scene 122. Certain environmental scene conditions (e.g., weather, lighting, etc.) may cause features in the image to appear less clear. For example, the vehicle may be traveling through fog or through rain. In addition, a window (e.g., the windshield 121) through which the image sensor 102 captures the image may be foggy due to a difference between a temperature inside of the vehicle and a temperature outside of the vehicle, or may be otherwise unclear due to condensate or frost. When features in an image are difficult to discern (e.g., the image is "unclear"), the image may indicate an environmental scene condition (e.g., rain, fog, a foggy windshield, smog, haze etc.). In examples where the system 100 and the method 200 are used in conjunction with a vehicle assistance application (e.g., ADAS), an unclear image may be an indicator that an operator of the vehicle may not be able to see features (e.g., traffic signs, traffic lanes, pedestrians, other vehicles, trees, etc.) of the scene 122 outside of the vehicle. The environmental scene condition detection module 108 may detect unclear images from the image sensor 102 and may initiate an action to make operation of the vehicle safer.

The method 200 further includes optionally resizing the input image, at block 204. For example, the environmental scene condition detection module 108 may transform the image data 103 to resize the image. In a particular example, the environmental scene condition detection module 108 may resize the image to a 320×240 resolution. Resizing the image may allow the environmental scene condition detection module 108 to perform environmental scene condition detection using less computational resources (e.g., because the resized image is smaller than the image). In a particular example, the environmental scene condition detection module 108 may execute software or utilize a hardware module (e.g., a hardware module of an image processor) to resize the image.

The method 200 further includes extracting first features (e.g., a first stage classifier of the cascade classifier) from the image, at block 206. For example, the environmental scene condition detection module 108 may extract first data 104 from the image data 103. The first data 104 may correspond to dark feature data that describes high intensity values in channels of the image. For example, when the image is a red, green, blue (RGB) image, the dark feature data may describe which pixels in the image include high values in each of the red channel, the green channel, and the blue channel of the image. It should be noted that the system 100 and the method 200 are compatible with digital images that include an alternative set of channels (e.g., cyan, magenta, yellow, and black (CMYK)). The first data 104 may be indicative of contrast in the image. For example, dark feature data may identify pixels that have high intensity values (e.g., dark features). The dark feature data may further identify intensity values of the identified pixels. Thus, the dark feature data may be used to determine intensity differences (e.g., contrast) between pixels in dark areas of the image.

The method 200 further includes generating a first scene clarity score based on the first features (e.g., dark features), at block 208. In an illustrative example, a first scene clarity score 111 is generated using a first scene clarity model 110. To illustrate, the first scene clarity model 110 may be a supervised machine learning model that is "trained" based on a set of input images and/or input videos (e.g., sample images and/or sample videos), where each image is pre-categorized (e.g., by a vendor of the first scene clarity model 110) as being "clear" or "unclear." In some examples, the first scene clarity model 110 is a linear support vector model (SVM). As each additional input image is provided to the first scene clarity model 110 during the "training" phase, the first scene clarity model 110 adjusts a machine-learned "boundary" between "clear" and "unclear." The boundary may separate the input images based on dark features of the input images. In some examples, the first scene clarity model 110 is based on test video sequences in which one or more frames of the test video sequences have been pre-categorized as unclear or clear. Once the first scene clarity model 110 has been trained, a scene clarity score for an image may be determined based on whether dark features of the image (or image data) are on the "clear" or "unclear" side of the boundary, and/or how far the dark features are from the boundary. An image being classified as unclear may be an indication that the image is affected by an environmental scene condition (e.g., rain, fog, a foggy windshield, smog, haze etc.). Thus, by comparing the first scene clarity model 110 to the first data 104, the environmental scene condition detection module 108 may be able to generate a first scene clarity score 111 indicating a probability that the image is affected by an environmental scene condition.

The method 200 further includes comparing the first scene clarity score to a first threshold (e.g., determining whether the image is clear based on the first stage classifier of the cascade classifier), at block 210. For example, the environmental scene condition detection module 108 may compare the first scene clarity score 111 to a first threshold 112. The first threshold 112 may correspond to a threshold probability that the image is unclear based on the first scene clarity score 111. In a particular example, the first threshold 112 is 50% (e.g., the first scene clarity score 111 satisfies the first threshold 112 when the first scene clarity score 111 indicates that the image is more likely unclear than clear based on the first data 104). Comparing the first scene clarity score 111 to the first threshold 112 may be performed during a first stage of a cascade classifier to detect unclear images.

When the first scene clarity score does not satisfy the first threshold, the method 200 advances to block 202. For example, when the first scene clarity score 111 does not satisfy the first threshold 112, the environmental scene condition detection module 108 may classify the image as clear and wait to receive another image to classify.

The method 200 further includes extracting second features (e.g., a second stage classifier of the cascade classifier) from the image when the first scene clarity score satisfies the first threshold, at block 212. For example, when the first scene clarity score 111 satisfies the first threshold 112, the environmental scene condition detection module 108 may extract second data 105 from the data representing the image. In a particular example, the second data 105 includes the dark feature data in addition to data describing a gradient phase of the image (e.g., gradient feature data). The gradient phase may describe directional changes in intensity values of pixels in the image. The second data 105 may be more indicative of contrast in the image than the first data 104 because the second data 105 may include more information about intensity value changes throughout the image. However, since the second data 105 may include more information, determining/processing the second data 105 may be more time-consuming/computationally expensive.

The method 200 further includes comparing the second features to a second scene clarity model to determine a second scene clarity score, at block 214. In an illustrative example, a second scene clarity score 115 is generated using a second scene clarity model 114. To illustrate, the second scene clarity model 114 may be a supervised machine learning model that is "trained" based on a set of input images and/or videos (e.g., sample images and/or sample videos), where each image is pre-categorized (e.g., by a vendor of the second scene clarity model 114) as being "unclear" or "clear." In some examples, the second scene clarity model 114 is a linear support vector model (SVM). As each additional input image is provided to the second scene clarity model 114 during the "training" phase, the second scene clarity model 114 adjusts a machine-learned "boundary" between "unclear" and "clear." The boundary may separate the input images based on combinations of dark features and gradient phases of the input images (whereas the boundary in the first scene clarity model 112 may separate the input images based on dark features alone). For example, each input image may be considered a data point in space (the space may include more than three dimensions). Each point may be defined by coordinates corresponding to the dark features and gradient phases and the boundary may correspond to a hyperplane dividing the input images in the space into unclear and clear images. In some examples, the second scene clarity model 114 is based on test video sequences in which one or more frames of the test video sequences have been pre-categorized as unclear or clear. Once the second scene clarity model 114 has been trained, a scene clarity score may be determined based on whether a combination of dark features and a gradient phase (e.g., coordinates of the image in the space) of an image (or image data) is on the "unclear" or "clear" side of the boundary (e.g., the hyperplane), and/or how far the combination of the dark features and the gradient phase data is from the boundary. Thus, by comparing the second scene clarity model 114 to the second data 105, the environmental scene condition detection module 108 may generate a second scene clarity score 115 indicating a probability that the image is unclear (e.g., affected by an environmental scene condition).

The method 200 further includes comparing the second scene clarity score to a second threshold (e.g., determining whether the image is unclear based on the second stage classifier), at block 216. For example, the environmental scene condition detection module 108 may compare the second scene clarity score 115 to a second threshold 116. The second threshold 116 may correspond to a threshold probability that the image is unclear based on the second scene clarity score 115. In a particular example, the second threshold 116 is 50% (e.g., the second scene clarity score 114 satisfies the second threshold 116 when the second scene clarity score 115 indicates that the image is more likely unclear than clear based on the second data 105). Alternatively, the second threshold 116 may be different from the first threshold 112. For example, the first threshold 112 may be less strict than the second threshold 116 so that fewer images are eliminated from consideration as being unclear based on the first threshold 112. Comparing the second scene clarity model 114 to the second data 105 may be more computationally complex and may take more time than comparing the first scene clarity model 110 to the first data 104. Thus, by using a cascade classifier (e.g., determining whether an image is unclear based on a first classifier and then, when the image is classified as unclear based on the first classifier, determining whether the image is unclear according to a second classifier), the environmental scene condition detection module 108 may save time and/or computing cycles by determining that some images are clear based on relatively less complex features. The method 200 may retain accuracy by confirming that an image is unclear by using increasingly accurate (and complex) classifiers. It should be noted that while the flowchart of the method 200 shown in FIG. 2 includes two stages, more than two cascade classifier stages may be included in alternative embodiments. For example, a third stage classifier may include dark feature data, gradient phase data, and light features.

The method 200 further includes initiating an action when the second scene clarity score satisfies the second threshold, at block 218. For example, when the second scene clarity score 115 satisfies the second threshold 116, the environmental scene condition detection module 108 may classify the image as unclear and may initiate one or more actions (e.g., transmitting an output 118 configured to initiate the one or more actions at one or more modules) as described in further detail in the context of the system 100 being configured to initiate an action related to a vehicle with reference to FIG. 3. In other contexts, the actions may include performing image processing to clarify the image for use by a robot (e.g., a UAV), by a mobile device (e.g., a mobile phone or tablet computer), a wearable device (e.g., a personal mounted camera), a head mounted display, a gaming system, etc. The actions may also include activating or adjusting one or more systems of a robot (e.g., a UAV), of a mobile device (e.g., a mobile phone or tablet computer), of a wearable device (e.g., a personal mounted camera), of a head mounted display, etc. For example, in response to detecting an unclear image, the system 100 may cause a UAV to increase or decrease an altitude at which the UAV is flying. Alternatively, the system 100 may cause the UAV to process image data to produce clarified image data which can then be transported to another device and/or used for controlling movement of the UAV. It should be noted that neither the image sensor 102 nor the computing device 106 may be included in the device that performs the initiated action. To illustrate, a mobile device may include the image sensor 102 and the computing device 106. In response to detecting an unclear image, the mobile device (e.g., a mobile phone) may initiate an action by sending a message to another device (e.g., a robot). The method 200 may return to 202 after initiating the one or more actions. For example, after initiating an action, the environmental scene condition detection module 108 may wait to receive another input image.

The method 200 returns to block 202 when the second scene clarity score does not satisfy the second threshold. For example, when the second scene clarity score 115 does not satisfy the second threshold 116, the environmental scene condition detection module 108 may classify the image as clear and wait for another input image.

Using a cascade classifier to detect unclear images may reduce time/computation cycles used to detect unclear images by quickly identifying some images as clear using relatively less complex comparisons. In addition, using a resized image may reduce complexity of calculations. Thus, the environmental scene condition detection module 108 may enable more efficient scene detection while retaining accuracy.

Figure 3:
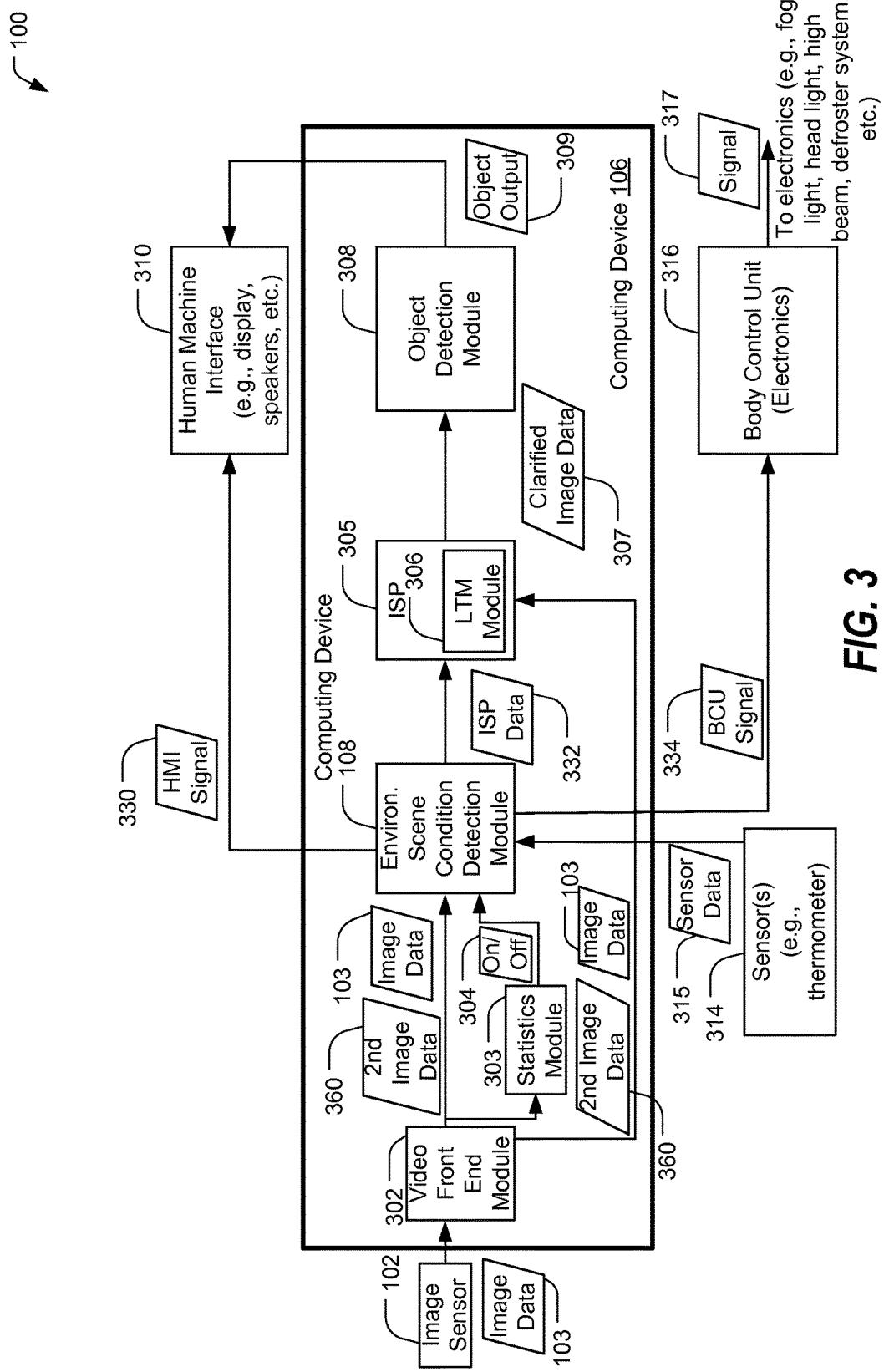
FIG. 3 is a block diagram illustrating another system for environmental scene condition detection.

Referring to FIG. 3, another block diagram of the system 100, including additional components, is shown. The system 100 includes the image sensor 102 and the computing device 106. The system 100 as shown in FIG. 3 may be integrated or partially integrated into a vehicle. For example, one or both of the image sensor 102 and the computing device 106 may be integrated into or located inside of a vehicle. FIG. 3 shows more details of the computing device 106. For example, the computing device 106 includes a video front end module 302, a statistics module 303, an image signal processor (ISP) 305, and an object detection module 308. The modules 302, 303, 108, 308 may correspond to software executed at the computing device 106. Alternatively, some or all of the modules 302, 303, 108, 308 may be hardware integrated into the ISP 305 (not shown) or may be software executed at the ISP 305 (not shown). The ISP 305 includes a local tone mapping (LTM) module 306. The LTM module 306 may be a hardware module or a software module.

The system 100 further includes a human machine interface (HMI) 310. The HMI 310 may correspond to a display device, such as a heads up display (HUD), a speaker, or a combination thereof. The HMI 310 may further include an input device (e.g., a touch screen, a keyboard, a control panel). The HMI 310 may be installed in the vehicle. For example, the HMI 310 may be mounted to a dashboard of the vehicle or attached to a windshield of the vehicle. In other examples, the HMI 310 may correspond to a mobile device, such as a phone, a tablet computer, a wearable computing device (e.g., data glasses), etc. The mobile device may be carried or viewed by an operator of the vehicle.

The video front end module 302, the environmental scene condition detection module 108, the ISP 305, the object detection module 308, and the HMI 310 may be parts of an advanced driver assistance system (ADAS).

The system 100 further includes one or more sensors 314. The one or more sensors 314 may include one or more thermometers (e.g., inside the vehicle, outside of the vehicle, or both), a navigation system (e.g., satellite navigation system), a light detection and ranging (LIDAR) device, inertial sensors, a map database, or a combination thereof.

The system 100 further includes a body control unit 316. The body control unit 316 may control various systems in the vehicle. For example, the body control unit 316 may control headlights, high beam lights, fog lights, an air conditioning system, a heater, a defrosting system, windshield wipers, or a combination thereof. The body control unit 316 may also include one or more interfaces for a wide area network connection, a personal area network connection, a local area network connection, or a combination thereof. For example, the body control unit 316 may include an Institute of Electrical and Electronics Engineers (IEEE) 802.11 interface, a Bluetooth® (Bluetooth is a registered trademark of Bluetooth SIG, Inc. of Kirkland, Wash.) interface, a Long-Term Evolution (LTE) interface, any other communications interface, or a combination thereof. The one or more interfaces may be used for vehicle to vehicle communication, vehicle to infrastructure communication, intra vehicle communication, or a combination thereof. In some examples, the system 100 further includes actuators (not shown) for other systems of the vehicle. For example, the system 100 may include gear actuators, a throttle actuator, a brake actuator, a steering actuator, or a combination thereof.

As explained above, the image sensor 102 may capture an image of a scene (e.g., the scene 122) viewed from the vehicle. Image data 103 representing the image may be sent to the computing device 106. The video front end module 302 may perform various operations on the image data 103 before sending the image data 103 to the environmental scene condition detection module 108. For example, in some examples, the video front end module 302 may transform the image data 103 to resize the image as described with reference to block 204 of FIG. 2. The video front end module 302 may further send the image data 103 to the statistics module 303. The statistics module 303 may be configured to identify various statistics based on the image data 103. For example, the statistics module 303 may identify that the image represented by the image data 103 depicts an indoor environment. Based on the various statistics, the statistics module 303 may generate an on/off signal 304 configured to enable or disable the environmental scene condition detection module 108. For example, when the vehicle is indoors, the statistics module 303 may disable the environmental scene condition detection module 108.

When the environmental scene condition detection module 108 is enabled, the environmental scene condition detection module 108 operates as described above with reference to FIGS. 1-2 to determine whether the image represented by the image data 103 is unclear. When the environmental scene condition detection module 108 identifies the image as unclear, the environmental scene condition detection module 108 may initiate one or more actions by generating one or more of an HMI signal 330, ISP data 332, and a BCU signal 334. Each of the HMI signal 330, the ISP data 332, and the BCU signal 334 may correspond to the output 118 shown in FIG. 1. In particular examples, the environmental scene condition detection module 108 determines which action or actions to initiate based on sensor data 315 received from the one or more sensors 314.

For example, in response to detecting an unclear image, the environmental scene condition detection module 108 may send the BCU signal 334 to initiate one or more actions by the BCU 316. The BCU 316 may be configured to activate (e.g., by sending a signal 317) electric systems of the vehicle in response to the BCU signal 334. For example, the environmental scene condition detection module 108 may cause the BCU 316 to activate fog lights, to turn off a high beam light, to activate windshield wipers, or a combination thereof.

In some implementations, the environmental scene condition detection module 108 may determine whether a window (e.g., a windshield) that the image sensor 102 faces is foggy or whether a lens of the image sensor is wet or foggy. To illustrate, the image sensor 102 may be located within a cabin, such as a passenger cabin of the vehicle, and may be positioned to capture a scene through a window of the vehicle. The environmental scene condition detection module 108 may receive the sensor data 315 that is associated with and/or corresponds to multiple temperatures, such as a first temperature inside the vehicle and a second temperature outside of the vehicle. The environmental scene condition detection module 108 may be configured to determine a temperature difference between the first temperature and the second temperature. When the temperature difference indicates that a difference between the first temperature (inside the vehicle) exceeds the temperature (outside the vehicle), the environmental scene condition detection module 108 may determine that the image captured by the image sensor 102 is unclear in part because the window that the image sensor 102 faces is foggy. In response to a determination that the window is foggy, the environmental scene condition detection module 108 may initiate an action, such as activating a heating, ventilation, or air conditioning (HVAC) system and/or a windshield wiper, as illustrative, non-limiting examples.

In some implementations, the system 100 may include multiple images sensors and the environmental scene condition detection module 108 may determine whether a window (e.g., a windshield) of the vehicle is compromised (e.g., wet, foggy, frosty, dirty, or otherwise contaminated to obstruct clarity) or whether a lens of a particular image sensor is compromised. The multiple image sensors may include the image sensor 102 that generates a first image (e.g., the image data 103) and a second image sensor (not shown) that generates a second image (e.g., second image data). The image sensor 102 may be located within the cabin of the vehicle and may be positioned to capture a scene through the window. The second image sensor may be located outside of the vehicle either onboard or located remotely from the vehicle. The environmental scene condition detection module 108 may receive the first image and the second image and may process each of the images as described with reference to FIG. 2.

When the second image sensor is located outside (e.g., onboard or remotely) the vehicle, the environmental scene condition detection module 108 may determine whether the first image is more clear than the second image. The environmental scene condition detection module 108 may determine the first image is more clear than the second image when the first image is determined to be clear and the second image is determined to be unclear. The environmental scene condition detection module 108 may determine the first image is less clear than the second image when the second image is determined to be clear and the first image is determined to be unclear. When the first image and the second image are both determined to be clear or both determined to be unclear, the environmental scene condition detection module 108 may compare a scene clarity score of the first image to a scene clarity score of the second image. For example, the environmental scene condition detection module 108 may compare the first scene clarity score 111 of the first image (e.g., the image data 103) to a first scene clarity score or a second scene clarity score of the second image. Alternatively or additionally, the environmental scene condition detection module 108 may compare the second scene clarity score 115 of the first image (e.g., the image data 103) to the first scene clarity score or the second scene clarity score of the second image.

In response to a determination that the first image (from the image sensor 102 in the vehicle) is more clear than the second image (from the second image sensor that is onboard outside the vehicle or remotely located outside the vehicle), the environmental scene condition detection module 108 may initiate a first set of one or more actions, such as generating the HMI signal 330 to cause the HMI 310 to indicate that the lens of the second image sensor is compromised (e.g., dirty or wet) and/or activating a heating, ventilation, and air conditioning (HVAC) system and/or a windshield wiper. In response to a determination that the first image is less clear than the second image, the environmental scene condition detection module 108 may initiate a second set of one or more actions, such as generating the HMI signal 330 to cause the HMI 310 to indicate that the lens of the first image sensor is compromised (e.g., dirty or wet). Accordingly, by comparing images received from two different image sensors, the environmental scene condition detection module 108 may identify potential issues with the image sensors (e.g., dirty and/or wet lenses) or with the environment (e.g., the window of the vehicle).

In some implementations, the system 100 may include the image sensor 102, the second image sensor (not shown), and a third image sensor (not shown). The image sensor 102 may be located in the cabin of the vehicle, the second image sensor may be located outside and onboard the vehicle, and the third image sensor may be located outside and remote from the vehicle. Each of the image sensors may generate a corresponding image, such as a first image (e.g., the image data 103) generated by the first image sensor 102, a second image (e.g., second image data) generated by the second image sensor, and a third image (e.g., third image data) generated by the third image sensor. The environmental scene condition detection module 108 may receive each of the first, second, and third images and may process each of the images as described with reference to FIGS. 1-2. Alternatively or additionally, the environmental scene condition detection module 108 may receive an indication from the third image sensor that an environmental condition is clear or unclear and/or may receive a scene clarity score determined based on the third image sensor. The environmental scene condition detection module 108 may compare the third image to the first image and/or the second image to determine whether the third image is more clear than the first image and/or the second image.

In response to a determination that the third image (from the third image sensor) is more clear than the first image (from the image sensor 102), the environmental scene condition detection module 108 may determine that a lens of the first image sensor is compromised and/or that a window of the vehicle is compromised. In response to a determination that the third image (from the third image sensor) is more clear than the second image (from the second image sensor), the environmental scene condition detection module 108 may determine that a lens of the second image sensor is compromised and/or that a window of the vehicle is compromised. In response to a determination that the third image is more clear than the first image and/or the second image, the environmental scene condition detection module 108 may initiate one or more actions, such as generating the HMI signal 330 and/or generating the BCU signal 334, as illustrative, non-limiting examples.

The system 100 may include one or more image sensors. For example, the one or more image sensors may include the image sensor 102 that is located in the cabin of the vehicle and/or a second image sensor located outside and onboard the vehicle. The environmental scene condition detection module 108 may receive data (e.g., via a communications interface of the BCU 316) from an external source (e.g., a computing device associated with a weather service) indicating an environmental condition information, such as clear or unclear. The environmental scene condition detection module 108 may compare the data that indicates an environmental condition to other data based on one or more images (e.g., image data) from the one or more image sensors. For example, the environmental scene condition detection module 108 may receive a first image (e.g., the image data 103) from the image sensor 102 (located in the vehicle) and may determine a first environmental condition using the first image.

The environmental scene condition detection module 108 may compare the environmental condition information to the first environmental condition. When the environmental scene condition detection module 108 determines that the first environmental condition is unclear while the environmental condition information from the external source indicates that environmental conditions are clear, the environmental scene condition detection module 108 may determine that the window is compromised and/or that a lens of the image sensor 102 is compromised. As another example, the environmental scene condition detection module 108 may compare the environmental condition information to a second environmental condition determined using the second image. When the environmental scene condition detection module 108 determines that the second environmental condition is unclear while the environmental condition information from the external source indicates that environmental conditions are clear, the environmental scene condition detection module 108 may determine that a lens of the second image sensor is compromised (e.g., dirty, wet, or foggy).

When the environmental scene condition detection module 108 determines that the window is foggy (or otherwise compromised) and/or that a lens of the image sensor 102 is dirty (or otherwise compromised), the BCU signal 334 may include a message or an activation signal configured to cause the BCU 316 to activate a heating, ventilation, and air conditioning (HVAC) system and/or a windshield wiper. Additionally or alternatively, the environmental scene condition detection module 108 may generate the HMI signal to cause the HMI 310 to present a message corresponding to the determined condition (e.g., the window is foggy or the image sensor 102 is dirty).

In some implementations, in response to determining that the image data 103 is unclear, the environmental scene condition detection module 108 may be configured to generate the BCU signal 334 to cause the BCU 316 to transmit a message over a communications interface. For example, the BCU 316 may transmit a message to another vehicle. The message may instruct the other vehicle to perform an action (e.g., to activate image clarification, to activate a system, to present a warning, or a combination thereof). Accordingly, the system 100 may share information about unclear and potentially hazardous conditions with other devices, such as other computing devices.

Additionally or alternatively, when the environmental scene condition detection module 108 detects that the image represented by the image data 103 is unclear, the environmental scene condition detection module 108 may send the ISP data 332 to the ISP 305. The ISP data 332 may carry the image data 103 or a processed version (e.g., resized) of the image data 103. In some examples, the ISP data 332 may include second image data 360 representing a second image captured by the image sensor 102 after the image represented by the image data 103 was captured. In some examples, the ISP 305 receives image data (e.g., the image data 103 and/or the second image data 360) directly from the video front end module 302. In such examples, the ISP data 332 may enable clarifying by the ISP 305. In some examples, the ISP data 332 includes the first scene clarity score 111 and/or the second scene clarity score 115 calculated as described above with reference to FIGS. 1 and 2. In response to the ISP data 332, the ISP 305 generates "clarified" image data 307 representing a clarified image. For example, the LTM module 306 may boost local contrast (e.g., adjust intensity values of pixels to increase differences between neighboring pixels potentially rendering objects in the image clearer) in high intensity regions of the image (or the second image). When the ISP data 332 includes the first scene clarity score 111 and/or the second scene clarity score 115, the LTM module 306 may generate the clarified image data 307 based on one or both of the first scene clarity score 111 and the second scene clarity score 115. For example, a degree of adjustment to each pixel in an image may be based on one or both of the first scene clarity score 111 and the second scene clarity score 115. To illustrate, a greater adjustment may be applied to pixel intensities when the first scene clarity score 111 and/or the second scene clarity score 115 is high as compared to when the first scene clarity score 111 and/or the second scene clarity score 115 is low (e.g., the degree of adjustment may be positively correlated with the first scene clarity score 111 and/or the second scene clarity score 115). By using a hardware module, such as, the LTM module 306, the system 100 may generate the clarified image data 307 more quickly than alternative systems. Generating the clarified image data 307 quickly may be beneficial in situations when circumstances change quickly (e.g., as a vehicle moves through an environment at high speeds).

The ISP 305 may send the clarified image data 307 to the object detection module 308. The object detection module 308 may identify objects in the clarified image and provide a detected object output 309 (e.g., collision warnings, speed limit notices, lane assistance, etc.) to the vehicle operator via the HMI 310. The object output 309 may include a visual representation of an object detected in the clarified image. For example, the HMI 310 may output the clarified image and may output an overlay over the clarified image. The overlay may include a representation (e.g., an outline, highlighting, etc.) of detected objects (e.g., street lanes, signs, other vehicles, pedestrians, animals, etc.) in the clarified image. The object output 309 may include a warning to be output by the HMI 310 (e.g., via a display screen, a speaker, etc.). The warning may include an audio warning, a text warning, a visual warning (e.g., a video or an image), or a combination thereof. For example, the warning may correspond to an audio message including an announcement, such as "tree ahead" or a text message, such as "pedestrian ahead." In some examples, the object detection module 308 may send a message to activate actuators of the vehicle (e.g., steering, throttle, brakes, gear shift, etc.) based on objects detected in the clarified image. For example, the object detection module 308 may send a message to activate brakes of the vehicle when an object in front of the vehicle is detected in the clarified image.

As a further example, when the environmental scene condition detection module 108 detects that the image represented by the image data 103 is unclear, the environmental scene condition detection module 108 may send the HMI signal 330 to the HMI 310. The HMI signal 330 may cause the HMI 310 to present a warning (e.g., via a display screen, a speaker, etc.). The warning may be an audio warning, a text warning, a visual warning (e.g., a video or an image), or a combination thereof. The warning may indicate that conditions are unclear and that an operator of the vehicle may have difficulty detecting objects outside of the vehicle.

It should be noted that the environmental scene condition detection module 108 may generate one or more outputs in response to determining that an image is clear. For example, the environmental scene condition detection module 108 may send the BCU signal 334 to the BCU 316 to cause the BCU 316 to deactivate electronics of the vehicle (e.g., turn off a fog light, a defroster system, etc.) The environmental scene condition detection module 108 may send the ISP data 332 to the ISP 305 to turn off a clarifying function of the ISP 305. Further, the environmental scene condition detection module 108 may send the HMI signal 330 to the HMI 310 to cause the HMI 310 to output a "clear conditions" status (e.g., via a display or via a speaker).

As explained above, one or both of the image sensor and the computing device 106 may be located outside of the vehicle. For example, the computing device may be a server located in a computer center that communicates with the vehicle through a connection established with an interface of the BCU 316. The server may send the HMI signal 330, the BCU signal 334, the object output 309, or a combination thereof to the vehicle via the connection. Therefore, environmental scene detection and clarification may be performed outside of the vehicle. Further, environmental scene detection and clarification may be performed based on image data captured outside of the vehicle. For example, the image sensor 102 may be located at a weather station, a weather balloon, another vehicle, or some other location.

Thus, the system 100 may enable detection of unclear conditions that may impact operations of a vehicle. In addition, the system 100 may enable automatic initiation of actions that may mitigate potential dangers of operating the vehicle.

Figure 4:
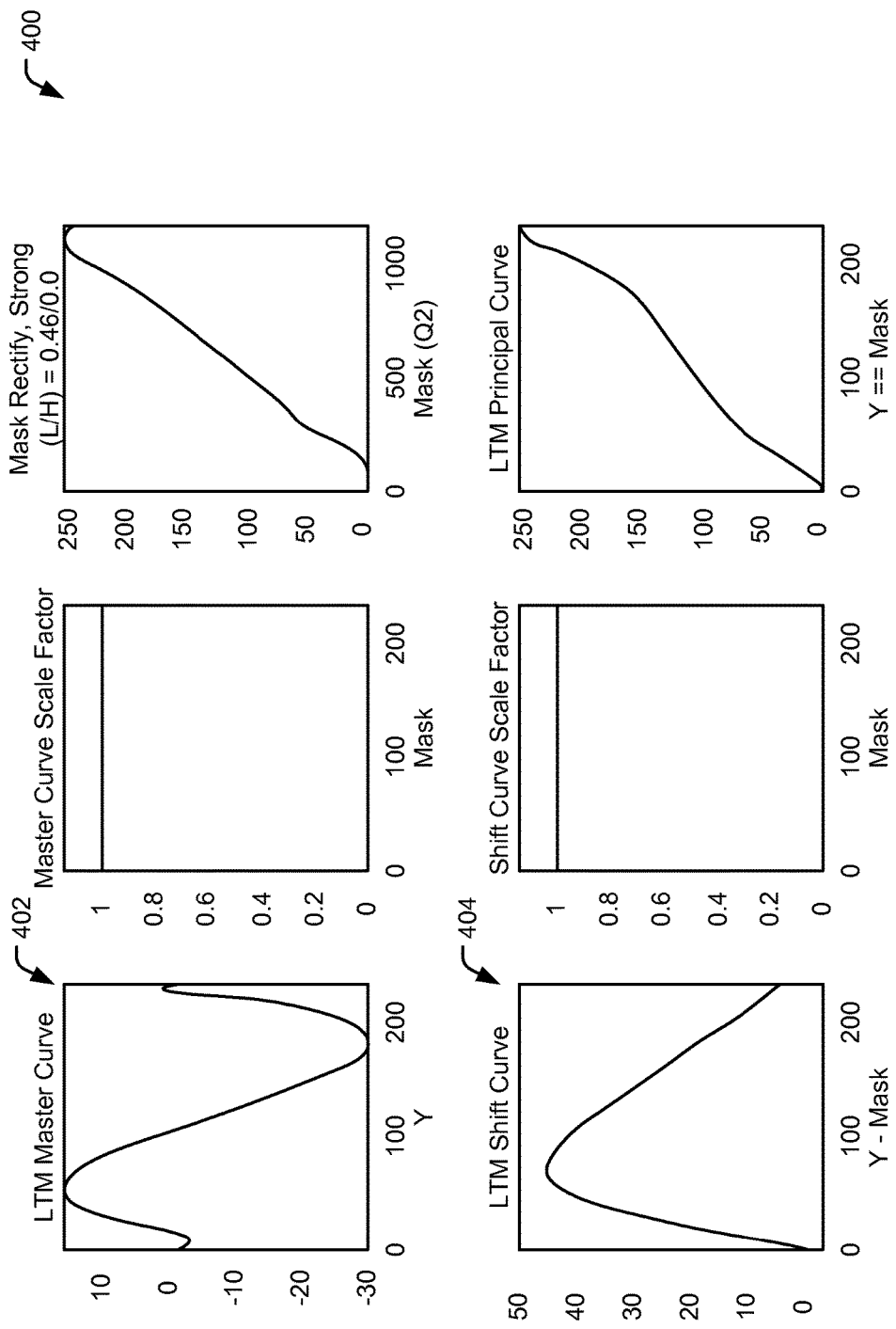
FIG. 4 is a diagram illustrating local tone mapping (LTM) functions that may be used to generate a clarified image.

Referring to FIG. 4, a diagram 400 is shown illustrating various graphs corresponding to LTM functions that may be used by the LTM module 306 to generate the clarified image data 307. A digital image (e.g., the image represented by the image data 103 or the second image represented by the second image data 360) may be composed of pixels. Each pixel may have an intensity value in one or more channels (e.g., red, green, blue). The intensity value may range from 0-255. For each pixel in an image, the LTM module 306 may adjust the pixel's intensity in one or more of the channels based on intensities of neighboring pixels. An LTM master curve 402 shows adjustments applied to the pixel's intensity (along the Y-axis) for different average intensities of neighboring pixels (along the X-axis). As illustrated, the LTM module 306 may increase an intensity of a pixel in a low intensity area and may decrease an intensity of a pixel in a high intensity area.

An LTM shift curve 404 shows how an intensity of a pixel is adjusted (along the Y-axis) based on a difference (along the Y-axis) between the intensity and an average intensity of neighboring pixels. Both the LTM master curve 402 and the LTM shift curve 404 may be based on one or more of the first scene clarity score 111 and the second scene clarity score 115. For example, adjustments to pixel intensities may be increase as a scene clarity score (one or both of the first scene clarity score 111 and the second scene clarity score 115) increases.

Figure 5:
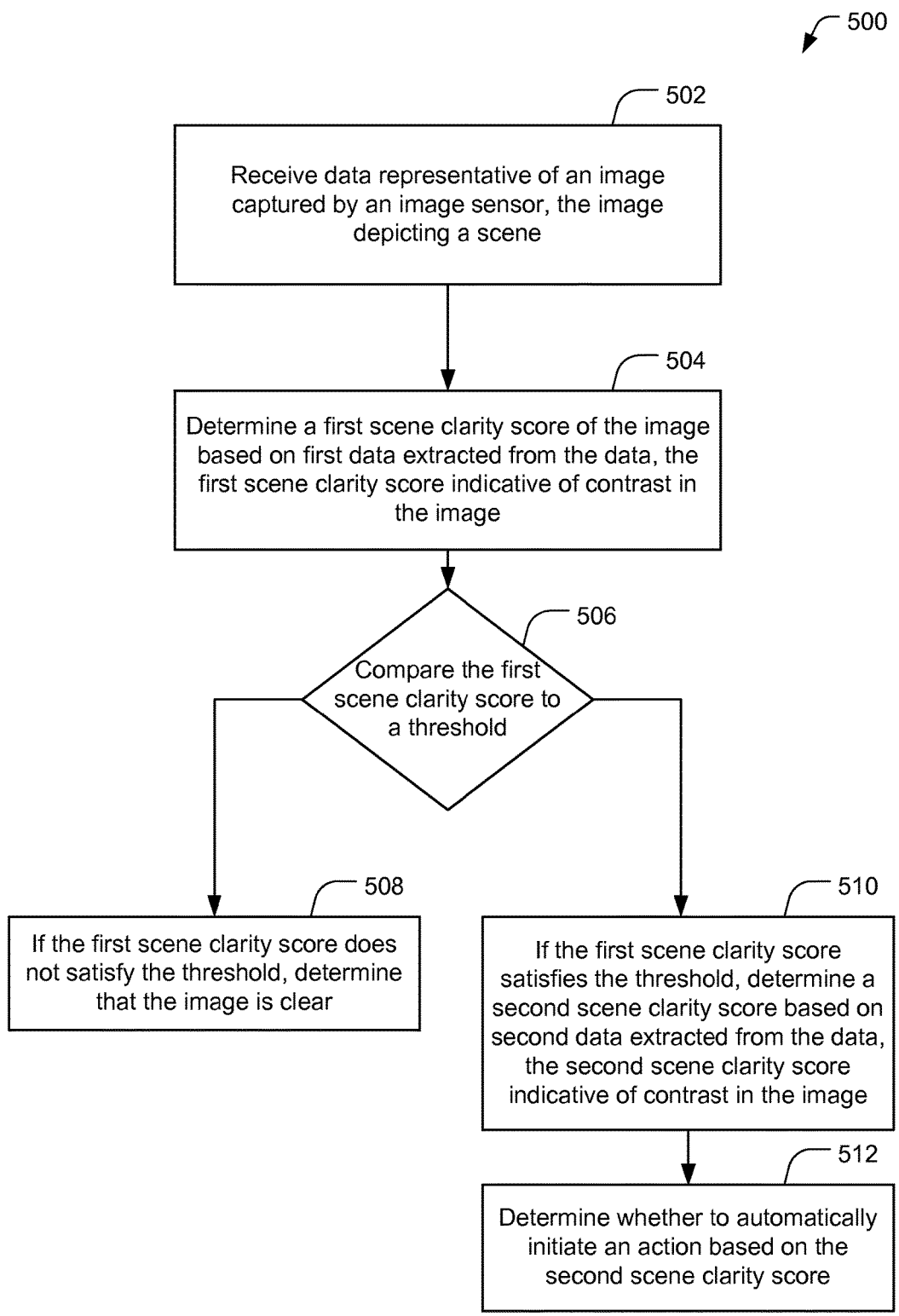
FIG. 5 is a flowchart illustrating another particular method of environmental scene condition.

Referring to FIG. 5, a flowchart illustrating a method 500 for identifying unclear images is shown. The method 500 includes receiving data representative of an image captured by an image sensor, the image depicting a scene, at block 502. For example, the computing device 106 may receive the image data 103. The image data 103 may represent an image of the scene 122 captured by the image sensor 102. In some examples, the scene 122 may be representative of a scene viewed from a vehicle.

The method 500 further includes determining a first scene clarity score of the image based on first data extracted from the data, the first scene clarity score indicative of contrast in the image, at block 504. For example, the environmental scene condition detection module 108 may determine the first scene clarity score 111 based on the first data 104 extracted from the image data 103.

The method 500 further includes comparing the first scene clarity score to a threshold, at block 506. For example, the environmental scene condition detection module 108 may compare the first scene clarity score 111 to the first threshold 112. If the first scene clarity score does not satisfy the threshold, the method 500 further includes determining that the image is clear (e.g., that no environmental scene condition is detected), at block 508. For example, the environmental scene condition detection module 108 may determine that the image represented by the image data 103 is clear in response to the first scene clarity score 111 not satisfying the first threshold 112.

If the first scene clarity score does satisfy the threshold, the method 500 includes determining a second scene clarity score based on second data extracted from the data, the second scene clarity score indicative of contrast in the image, at block 510. For example, if the first scene clarity score 111 satisfies the first threshold 112, the environmental scene condition detection module 108 may determine the second scene clarity score 115 based on the second data 105.

The method 500 further includes determining whether to automatically initiate an action based on the second scene clarity score, at 512. For example, the environmental scene condition detection module 108 may compare the second scene clarity score 115 to the second threshold 116 to determine whether to initiate an action via the output 118.

Thus, the method 500 may use a two stage comparison to determine whether an image is unclear and an action should be initiated.

Figure 6:
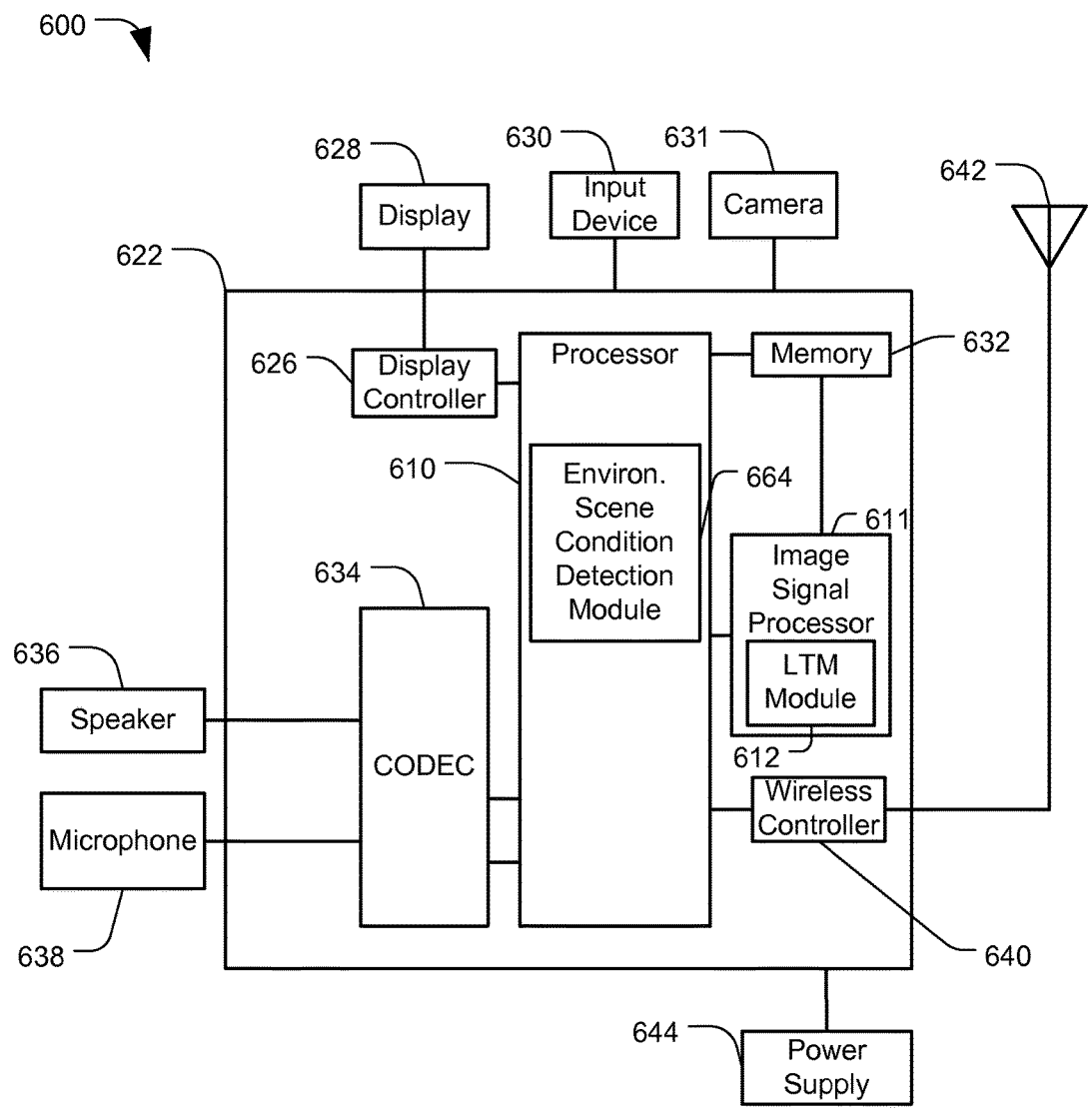
FIG. 6 is a flowchart illustrating a device that may be used for environmental scene condition.

Referring to FIG. 6, a block diagram of a particular illustrative embodiment of a device 600 (e.g., an electronic device) is depicted. The device 600 may correspond to the computing device 106. The device 600 includes a processor 610 coupled to a memory 632. The processor 610 may execute an environmental scene condition detection module 664, such as the environmental scene condition detection module 108.

The memory 632 may include data and instructions, such as computer-readable instructions or processor-readable instructions. The data and instructions may be associated with executing the environmental scene condition detection module 664.

FIG. 6 also shows a display controller 626 that is coupled to the processor 610 and to a display 628. A coder/decoder (CODEC) 634 can also be coupled to the processor 610. A speaker 636 and a microphone 638 can be coupled to the CODEC 634. The speaker 636, the microphone 638, the display 628, or a combination thereof may correspond to the HMI 310.

FIG. 6 also includes a camera 631. The camera 631 may correspond to the image sensor 102. The camera 631 may be physically coupled to the device 600 or may communicate with the device 600 wirelessly.

FIG. 6 also includes an image signal processor 611 coupled to the memory and to the processor 610. The image signal processor 611 may correspond to the ISP 305. The image signal processor 611 includes an LTM module 612. The LTM module 612 may be a hardware module or a software module and may correspond to the LTM module 306.

FIG. 6 also indicates that a wireless interface 640 can be coupled to the processor 610 and to an antenna 642. The device 600 may communicate with other devices, such as the body control unit 316 or the HMI 310 via the wireless interface 640 and the antenna 642. In alternate embodiments, the device 600 may communicate with other devices, such as the body control unit 316 or the HMI 310 via a wired connection. In some implementations, the processor 610, the display controller 626, the memory 632, the CODEC 634, and the wireless interface 640 are included in a system-in-package or system-on-chip device 622. In a particular embodiment, an input device 630 and a power supply 644 are coupled to the system-on-chip device 622. Moreover, in a particular embodiment, as illustrated in FIG. 6, the display 628, the input device 630, the speaker 636, the microphone 638, the antenna 642, and the power supply 644 are external to the system-on-chip device 622. However, each of the display 628, the input device 630, the speaker 636, the microphone 638, the antenna 642, and the power supply 644 can be coupled to a component of the system-on-chip device 622, such as an interface or a controller. Although the environmental scene condition detection module 664 is depicted as being executed by the processor 610, in other implementations, the environmental scene condition detection module 664 may be included in another component of the device 600 or a component coupled to the device 600. For example, the environmental scene condition detection module 664 may correspond to hardware included in the image signal processor 611.

In an embodiment, an apparatus includes means for receiving data representative of an image. The means for receiving data may correspond to the image sensor 102, the camera 631, the computing device 106, the video front end module 302, the system-on-chip device 622, a communications interface of the BCU 316, or a combination thereof. The apparatus further includes means for image processing configured to receive data representative of an image captured by the means for capturing images. The means for image processing may be further configured to determine a first scene clarity score of the image based on first data extracted from the data. The means for image processing may be further configured to determine whether the first scene clarity score satisfies a threshold, and if the first scene clarity score satisfies the threshold, determine a second scene clarity score based on second data extracted from the data when the first scene clarity score satisfies the threshold. The means for image processing may further be configured to determine whether to automatically initiate an action based on the second scene clarity score. The means for image processing may correspond to the computing device 106, the environmental scene condition detection module 108, the device 600, the processor 610, the environmental scene condition detection module 664, or to a combination thereof.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method for processing data at a computing device associated with a vehicle, the method comprising:

receiving, by the computing device, the data representative of at least a portion of an image captured by an image sensor, the image depicting a scene;

calculating, by the computing device, a first scene clarity score based on first data extracted from the data;

performing, by the computing device, a comparison based on the first scene clarity score and a threshold;

in response to a result of the comparison, calculating, by the computing device, a second scene clarity score based on second data extracted from the data, the second data including the first data and additional data; and initiating, by the computing device, an action by the vehicle in response to an identification of an environmental condition based on the second scene clarity score.

2. The method of claim 1, further comprising:
extracting the first data and the second data from the data; and
determining whether the scene includes the environmental condition based on the second scene clarity score.

3. The method of claim 1, wherein the additional data includes gradient feature data.

4. The method of claim 1, wherein initiating the action comprises activating a heating, ventilation, and air conditioning (HVAC) system of the vehicle, and further comprising determining whether the environmental condition is present on a window of the vehicle.

5. The method of claim 1, wherein initiating the action comprises activating a windshield wiper of the vehicle.

6. The method of claim 1, wherein the second scene clarity score is calculated in response to the first scene clarity score exceeding the threshold, and wherein the first scene clarity score and the second scene clarity score are indicative of contrast in the image.

7. The method of claim 1, wherein initiating the action includes activating a fog light of the vehicle, providing an audio warning, providing a visual warning, or a combination thereof.

8. The method of claim 1, wherein the action includes processing the data to produce clarified image data.

9. The method of claim 8, wherein producing the clarified image data includes using local tone mapping (LTM) to boost local contrast in high intensity regions of the image.

10. The method of claim 8, wherein intensity values of one or more pixels in the image are modified by amounts selected based on one or both of the first scene clarity score and the second scene clarity score.

11. The method of claim 8, further comprising performing object detection based on the clarified image data and providing an output to an output device of a vehicle based on the object detection.

12. The method of claim 1, wherein the first data includes dark feature data that corresponds to pixels in the image that have a high intensity value in at least one of a red channel, a green channel, and a blue channel of the image.

13. The method of claim 1, wherein calculating the first scene clarity score includes comparing the first data to a model generated using machine learning.

14. The method of claim 1, further comprising:
comparing the second scene clarity score to a second threshold; and
identifying the environmental condition based on the second scene clarity score satisfying the second threshold.

15. The method of claim 1, wherein the image is included in a plurality of images received from the image sensor, and further comprising selecting a particular image of the plurality of images and selectively processing the particular image to calculate a corresponding scene clarity score.

16. An apparatus comprising:
a memory; and
a processor coupled to the memory and configured to:
receive data representative of at least a portion of an image captured by an image sensor, the image depicting a scene associated with a vehicle;
calculate a first scene clarity score of the image based on first data extracted from the data;
perform a comparison based on the first scene clarity score and a threshold;
in response to a result of the comparison, calculate a second scene clarity score based on second data extracted from the data, the second data including the first data and additional data; and
in response to an identification of an environmental condition based on the second scene clarity score, initiate an action by the vehicle.

17. The apparatus of claim 16, further comprising the image sensor, wherein the image sensor is located within a passenger compartment of the vehicle.

18. The apparatus of claim 16, wherein the processor includes a local tone mapping (LTM) module, and wherein the action includes using the LTM module to generate clarified image data.

19. The apparatus of claim 18, wherein the LTM module is configured to generate the clarified image data based on second data representative of at least a portion of a second image, the second image captured by the image sensor after the image sensor captured the image.

20. The apparatus of claim 18, wherein the LTM module is configured to modify intensity values of one or more pixels in the image by amounts selected based on one or both of the first scene clarity score and the second scene clarity score, and wherein the amounts are positively correlated with one or both of the first scene clarity score and the second scene clarity score.

21. The apparatus of claim 16, further comprising a body control unit configured to control one or more electronic systems of the vehicle, wherein the memory is configured to store the data.

22. The apparatus of claim 16, further comprising a speaker configured to output an audio warning associated with the action.

23. The apparatus of claim 16, wherein the processor is further configured to perform the action to generate clarified image data, and further comprising a display device onboard the vehicle, the display device configured to display a clarified image represented by the clarified image data.

24. The apparatus of claim 16, wherein the processor is further configured to perform the action to generate clarified image data and to detect an objects based on the clarified image data.

25. The apparatus of claim 16, wherein the action includes activating a heating, ventilation, and air conditioning (HVAC) system, activating a windshield wiper, activating a fog light of a vehicle, providing an audio warning, providing a visual warning, or a combination thereof.

26. A non-transitory computer-readable storage medium storing instructions that, when executed by a processor, cause the processor to perform operations including:
receiving data representative of at least a portion of an image captured by an image sensor, the image depicting a scene associated with a vehicle;

calculating a first scene clarity score based on first data extracted from the data;
performing a comparison based on the first scene clarity score and a threshold; and
in response to a result of the comparison:
  calculating a second scene clarity score based on second data extracted from the data, the second data including the first data and additional data; and
  in response to an identification of an environmental condition based on the second scene clarity score, initiating performance of an action by the vehicle.

27. The non-transitory computer-readable storage medium of claim 26, wherein the first scene clarity score is calculated by comparing a first linear support vector model to the first data, and wherein the second scene clarity score is calculated by comparing a second linear support vector model to the second data.

28. The non-transitory computer-readable storage medium of claim 27, wherein each of the first linear support vector model and the second linear support vector model is generated using sample videos.

29. An apparatus comprising:
means for receiving data representative of at least a portion of an image; and
means for image processing configured to:
  calculate a first scene clarity score of the image based on first data extracted from the data, the first scene clarity score indicative of contrast in the image;
  perform a comparison based on the first scene clarity score and a threshold; and
  in response to a result of the comparison:
    calculate a second scene clarity score based on second data extracted from the data, the second data including the first data and additional data; and
    initiate an action by a vehicle based on the second scene clarity score.

30. The apparatus of claim 29, wherein the action includes processing the data to produce clarified image data, activating a fog light of a vehicle, providing an audio warning, providing a visual warning, or a combination thereof.

31. A method for processing data at a computing device associated with a vehicle, the method comprising:
receiving, by the computing device, the data representative of at least a portion of an image captured by an image sensor, the image depicting a scene;
calculating, by the computing device, a first scene clarity score based on first data extracted from the data;
performing, by the computing device, a comparison based on the first scene clarity score and a threshold;
in response to a result of the comparison, calculating, by the computing device, a second scene clarity score based on second data extracted from the data, the second data including the first data and additional data; and
initiating, by the computing device and based on the second scene clarity score, processing the data to produce clarified image data.

32. The method of claim 31, further comprising processing, by the computing device, the data to produce the clarified image data.

33. The method of claim 31, wherein the computing device comprises a wearable computing device.

34. The method of claim 31, wherein the computing device is incorporated in the vehicle.

35. An apparatus comprising:
a memory; and
a processor coupled to the memory and configured to:
  receive data representative of at least a portion of an image captured by an image sensor, the image depicting a scene associated with a vehicle;
  calculate a first scene clarity score of the image based on first data extracted from the data;
  perform a comparison based on the first scene clarity score and a threshold;
  in response to a result of the comparison, calculate a second scene clarity score based on second data extracted from the data, the second data including the first data and additional data; and
  initiate, based on the second scene clarity score, processing the data to produce clarified image data.

36. The apparatus of claim 35, wherein the processor is further configured to process the data to produce the clarified image data.

37. The apparatus of claim 35, wherein the memory and the processor are incorporated in a wearable computing device.

38. The apparatus of claim 35, wherein the memory and the processor are incorporated in the vehicle.

* * * * *